United States Patent
Shragai et al.

(10) Patent No.: US 7,386,164 B2
(45) Date of Patent: Jun. 10, 2008

(54) AUTOMATIC PROCESSING OF AERIAL IMAGES

(75) Inventors: Meir Shragai, Maccabeem (IL); Joseph Liberman, Herzlia (IL)

(73) Assignees: M.A.M.D. Digital Data Processing Systems Ltd., Herzlia (IL); Elta Systems Ltd., Ashdod (IL)

( * ) Notice: Subject to any disclaimer, the term of this patent is extended or adjusted under 35 U.S.C. 154(b) by 0 days.

(21) Appl. No.: 10/550,799

(22) PCT Filed: Mar. 23, 2004

(86) PCT No.: PCT/IL2004/000263

§ 371 (c)(1),
(2), (4) Date: Jun. 28, 2006

(87) PCT Pub. No.: WO2004/084136

PCT Pub. Date: Sep. 30, 2004

(65) Prior Publication Data
US 2006/0239537 A1    Oct. 26, 2006

(30) Foreign Application Priority Data
Mar. 23, 2003  (IL)  ..................................... 155034

(51) Int. Cl.
*G06K 9/00*    (2006.01)

(52) U.S. Cl. ..................................................... 382/154
(58) Field of Classification Search ................ 382/154, 382/260, 263, 264, 285
See application file for complete search history.

(56) References Cited

U.S. PATENT DOCUMENTS

| 6,049,619 | A | 4/2000 | Anandan et al. | |
| 6,353,678 | B1 | 3/2002 | Guo et al. | |
| 6,963,662 | B1* | 11/2005 | LeClerc et al. | 382/154 |
| 6,970,593 | B2* | 11/2005 | Furukawa | 382/154 |
| 6,985,620 | B2* | 1/2006 | Sawhney et al. | 382/154 |

* cited by examiner

*Primary Examiner*—Tom Y. Lu

(57) ABSTRACT

Change detection apparatus for detection of changes between first and second stereoscopic image pairs obtained at different times of a substantially similar view, comprises: a two-dimensional image filter for comparing first and second image pairs to obtain an initial list of change candidates from two-dimensional information in the image pairs, and a three-dimensional image filter for comparing the image pairs at locations of the change candidates using three-dimensional image information. The apparatus retains those change candidates correlating with three-dimensional image change and rejects change candidates not correlating with three-dimensional image change, and produces a refined list of change candidates.

4 Claims, 16 Drawing Sheets

AUTOMATIC PROCESSING OF AERIAL IMAGES

RELATED PATENT APPLICATION

This application is a National Phase Application of PCT/IL2004/000263 having International Filing Date of 23 Mar. 2004, which claims the benefit of Israel Patent Application No. 155034 filed 23 Mar. 2003. The contents of the above Application are all incorporated herein by reference.

FIELD AND BACKGROUND OF THE INVENTION

The present invention relates to a method and apparatus for processing of automatic images and, more particularly, but not exclusively to a method and apparatus that allows the automatic detection of changes from images taken of the same place at different times.

In the early days of aerial photography, images had to be pored over painstakingly to find out required information, especially when what was needed was to spot small changes. Today the task has been made easier by the use of automatic image analysis techniques to find candidate differences which are then presented to a human user to make a final identification. Nevertheless the sheer volume of photographic images that can be available in a high precision survey means that even such methods leave a huge amount of work for a human analyst to have to carry out. A high precision survey of a region may in fact photograph the region from a fairly low altitude with an ability to resolve objects of the ten-centimeter order of magnitude, and if a human analyst has to consider every suspect change that the computer locates then the effectiveness of the process is highly problematic.

A further issue is that the aerial photograph is taken from a certain position and a certain angular inclination. An aerial photograph needs to be converted into what is known as an orthophoto before it can be treated as a map. An aerial photograph and an orthophoto or orthoimage may look alike but there are several important differences that allow an orthophoto to be used like a map. A conventional perspective aerial photograph contains image distortions caused by the tilting of the camera and terrain relief (topography). It does not have a uniform scale. You cannot measure distances on an aerial photograph like you can on a map. That is to say, an aerial photograph is not a map. The effects of tilt and relief are conventionally removed from the aerial photograph by a mathematical process called rectification. The resulting orthophoto is a uniform-scale image. Since an orthophoto has a uniform scale, it is possible to measure directly on it, just as with a map. An orthophoto may serve as a base map onto which other map information may be overlaid. Until the issue of scale is dealt with, it is difficult to begin the process of looking for changes since two images taken from even slightly differing positions simply do not show the same thing.

However, even after dealing with the issue of scale, current automatic image processing systems have difficulty in ruling out irrelevant differences between photographs such as those due to naturally moving objects, those due to lighting changes between the times the photographs were taken, those due to failure to carry out accurate matching between the successively taken photographs and the like.

One method of matching images comprises finding the same point on the two images and using that as a reference location. However this does not always work since similar points which are not actually the same can erroneously be chosen. Thus any kind of terrain in which repeating features appear is liable to erroneous matching of similar neighbors.

There is thus a widely recognized need for, and it would be highly advantageous to have, an automatic feature matching system devoid of the above limitations.

SUMMARY OF THE INVENTION

According to one aspect of the present invention there is provided change detection apparatus for detection of changes between first and second stereoscopic image pairs obtained at different times of a substantially similar view, the apparatus comprising:

a two-dimensional image filter for comparing the first and second image pairs to obtain an initial list of change candidates from two-dimensional information in the image pairs, and a three-dimensional image filter for comparing at least one of the first and second image pairs at the change candidates using three-dimensional image information in the image pairs to retain change candidates correlating with three-dimensional image information and to reject change candidates not correlating with three-dimensional image information, thereby to produce a refined list of change candidates.

Preferably, the three-dimensional image filter is configured to compare three dimensional information in both the first and second image pairs, thereby to obtain three-dimensional change information, such that the retaining and the rejecting is on the basis of a correlation with the three dimensional change information.

Preferably, the two dimensional information is color information.

Additionally or alternatively, the two-dimensional information is texture information.

The apparatus may further comprise a movement elimination filter connected prior to the three-dimensional image filter, the movement filter comprising a two-dimensional comparator for comparing change candidates between images of the image pairs to eliminate changes occurring within an image pair as movement.

The apparatus may further comprise an alignment unit for aligning respective ones of the images to allow filtering, the alignment unit comprising a tie point unit for identifying a first image feature on one of the images, carrying out one-dimensional cross-correlation to find a corresponding image feature on a second of the images and then doing a reverse one-dimensional cross-correlation from the corresponding image feature to find the first image feature, the first image feature and the corresponding image feature being accepted for aligning only if the first image feature is successfully found by the reverse one-dimensional cross-correlation.

According to a second aspect of the present invention there is provided a method of automatic change detection between earlier and later images of a scene, wherein two-dimensional and three dimensional data is available, the method comprising:

obtaining an initial list of candidate changes from the two-dimensional data, and eliminating from the initial list those candidate changes which do not correspond to three-dimensional changes.

According to a third aspect of the present invention there is provided change detection apparatus for detection of changes between first and second stereoscopic image pairs obtained at different times of a substantially similar view, the apparatus comprising:

a comparator for comparing at least candidate portions of each one of the first stereoscopic image pair at least with corresponding candidate portions of each one of the second stereoscopic image pair to obtain four measures of change thereat, a thresholder for eliminating ones of the at least candidate portions of the image from a list of changes based on a lowest one of the four measures, thereby to refine the candidate list of changes.

According to a fourth aspect of the present invention there is provided a change detection method for detection of changes between first and second stereoscopic image pairs obtained at different times of a substantially similar view, the method comprising:

comparing at least candidate portions of each one of the first stereoscopic image pair at least with corresponding candidate portions of each one of the second stereoscopic image pair to obtain four measures of change thereat, and eliminating ones of the at least candidate portions of the image from a list of changes based on a lowest one of the four measures, thereby to refine the candidate list of changes.

According to a fifth aspect of the present invention there is provided an epipolar validation apparatus for validation of features matched between first and second stereoscopic image pairs, the image pairs being obtained at different times of a substantially similar view, the apparatus comprising:

a first image feature locater for locating the feature in the first image, a one dimensional cross correlator for carrying out a one-dimensional search to find the feature in the second image, a reverse correlator for using the feature in the second image as a starting point and searching for the feature in the first image, and a validator for accepting the match only if the feature in the second image leads to the feature in the first image.

According to a sixth aspect of the present invention there is provided an epipolar validation method for validation of features matched between first and second stereoscopic image pairs, the image pairs being obtained at different times of a substantially similar view, the method comprising:

locating a feature in the first image, carrying out a one-dimensional search to find the feature in the second image, using the feature in the second image as a starting point and carrying out a one-dimensional search for the feature in the first image, and accepting the match only if the feature in the second image leads to the feature in the first image.

Preferably, the one-dimensional searches comprise cross-correlating.

According to a seventh aspect of the present invention there is provided a three-dimensional change detector unit for detecting changes between a first stereoscopic image pair and a second stereoscopic image pair, the apparatus comprising:

a preliminary processor for processing the first and second images to produce a candidate list of changes;

a digital terrain model creator for creating, from each of the stereoscopic image pairs, a first and a second digital terrain model respectively of at least positions indicated in the candidate list of changes from three-dimensional information in each stereoscopic pair, a tie unit for finding corresponding points about the positions and for tying the points at the same heights in the first and second digital terrain maps, a triangulator for triangulating within the tie points to eliminate changes that do not show up as height differences between the first and the second digital terrain maps, thereby to produce a refined list of changes.

According to an eighth aspect of the present invention there is provided a three-dimensional change detection method for detecting changes between a first stereoscopic image pair and a second stereoscopic image pair, the method comprising:

processing the first and second images to produce a candidate list of changes;

creating, from each of the stereoscopic image pairs, a first and a second digital terrain model respectively of at least positions indicated in the candidate list of changes from three-dimensional information in each stereoscopic pair, finding corresponding points about the positions and tying the points at the same heights in the first and second digital terrain maps, triangulating within the tie points to eliminate changes that do not show up as height differences between the first and the second digital terrain maps, thereby to produce a refined list of changes.

According to a ninth aspect of the present invention there is provided a three-dimensional change detector unit for detecting changes between a first stereoscopic image pair and a second stereoscopic image pair, the apparatus comprising:

a preliminary processor for processing the first and second images to produce a candidate list of changes;

a digital terrain model creator for creating, from each of the stereoscopic image pairs, a first and a second digital terrain model respectively of at least positions indicated in the candidate list of changes from three-dimensional information in each stereoscopic pair, an equalizer for equalizing average height levels between the first and second digital terrain models, and a high pass filter for detecting high frequency differences between the first and second digital terrain models to affirm changes in the candidate list having high frequency components and to eliminate changes not having high frequency components, thereby to produce a refined list of changes.

The detector preferably comprises a low pass filter connected between the digital terrain model creator and the equalizer for elimination of low frequency differences between the first and the second digital terrain models.

According to a tenth aspect of the present invention there is provided a three-dimensional change detection method for detecting changes between a first stereoscopic image pair and a second stereoscopic image pair, the method comprising:

processing the first and second images to produce a candidate list of changes;

creating, from each of the stereoscopic image pairs, a first and a second digital terrain model respectively of at least positions indicated in the candidate list of changes from three-dimensional information in each stereoscopic pair, equalizing average height levels between the first and second digital terrain models, detecting high frequency differences between the first and second digital terrain models to affirm changes in the candidate list having high frequency components, and eliminating changes not having high frequency components, thereby to produce a refined list of changes.

According to an eleventh aspect of the present invention there is provided apparatus for registration of an aerial photograph with a reference orthophoto, the apparatus comprising:

a registration unit, and a cross-correlator for:
a) making an initial registration attempt between the aerial photograph or a reduced version thereof and the reference orthophoto, based on a first tie point,
b) carrying out a first cross correlation between the photograph and the orthophoto according to the registration attempt, to obtain a first correspondence measure,
c) at least once changing a parameter, making a new registration attempt between the aerial photograph or a reduced version thereof and the orthophoto, and carrying out a further cross correlation to obtain a further correspondence measure, and a selector for selecting as an output the registration attempt yielding the highest correspondence measure.

Preferably, the parameter is a height parameter of the aerial photograph or a reduced version thereof.

The apparatus is preferably configured to carry out stepwise changing of the height, and to make a registration attempt at each step.

Preferably the step is substantially one meter.

Preferably, the parameter is an angle of the aerial photograph or a reduced version thereof.

In an embodiment, the parameter is initially an angle parameter, and wherein the registration unit and the cross correlator are configured to repeat stage c) wherein the parameter is a height of the aerial photograph.

The apparatus is preferably operable to carry out stepwise changing of the angle within a range and to make a registration attempt at each step.

In an embodiment, the range is substantially ten degrees and the step is substantially one degree.

Preferably, the registration attempts are carried out on the reduced version and the reduced version is obtained from a pixel reduction unit located prior to the registration unit.

Preferably, the registration unit, the cross correlator and the selector are configured to repeat the initial and at least one further registration attempt for a second tie point.

Preferably, the registration unit, the cross correlator and the selector are configured to repeat the initial and at least one further registration attempt for a third and fourth tie point respectively.

The apparatus may further comprise a contour follower for following contours along diagonals between the four tie points to determine a quality of the output registration.

According to a twelfth aspect of the present invention there is provided a method for registration of an aerial photograph with a reference orthophoto, comprising:
a) making an initial registration attempt between the aerial photograph or a reduced version thereof and the reference orthophoto, based on a first tie point,
b) carrying out a first cross correlation between the aerial photograph and the reference orthophoto according to the registration attempt to obtain a first correspondence measure,
c) at least once changing a parameter, making a new registration attempt between the aerial photograph or a reduced version thereof and the orthophoto, and carrying out a further cross correlation to obtain a further correspondence measure, and
d) selecting as an output the registration attempt yielding the highest correspondence measure.

Preferably, the parameter is a height parameter of the aerial photograph or a reduced version thereof.

The method may comprise carrying out stepwise changing of the height, and making a registration attempt at each step.

Preferably, the step is substantially one meter.

Additionally or alternatively, the parameter is an angle of registration of the aerial photograph or a reduced version thereof.

Preferably, the parameter is initially an angular parameter, and wherein the method further comprises repeating stage c) wherein the parameter is a registration height of the aerial photograph.

The method may comprise carrying out stepwise changing of the angle within a range and making a registration attempt at each step.

The method may comprise setting the range to be of the order of ten degrees and the step to be of the order of one degree.

Preferably, the registration attempts are carried out on the reduced version and the reduced version is obtained by a pixel reduction process.

The method may comprise repeating the initial and at least one further registration attempt for a second tie point.

The method may comprise repeating the initial and at least one further registration attempt for a third and fourth tie point respectively.

The method may comprise following contours along diagonals between the four tie points to determine a quality of the output registration.

According to a thirteenth aspect of the present invention there is provided apparatus for classification of tie points for registration of corresponding images, comprising:

a tie point identifier for identifying points in the corresponding images to serve as tie points, and a classifier for classifying the identified tie points as stable or unstable tie points, thereby to eliminate unstable tie points and base the registration on stable tie points.

Preferably, the classifier uses a stability index to classify the tie points.

Preferably, the stability index includes color as a stability indicator.

Preferably, the classifier is configured to classify green as unstable.

Preferably, the classifier is configured to classify at least one of brown and grey as stable.

Preferably, the stability index is usable with automatic object recognition to recognize predetermined objects as being stable or unstable.

Preferably, the classifier comprises a feature recognizer for recognizing any of bare earth, buildings, rocks and stones as being stable.

According to a fourteenth aspect of the present invention there is provided a method for classification of tie points for registration of corresponding images, comprising:

identifying points in the corresponding images to serve as tie points, and classifying the identified tie points as stable or unstable tie points, thereby to eliminate unstable tie points and base the registration on stable tie points.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps such as selecting control points manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

It is pointed out that in the following references are made to reference and current images, or to first and second images or prior and following or before and after images or image pairs. These various terms are intended to be synonymous.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
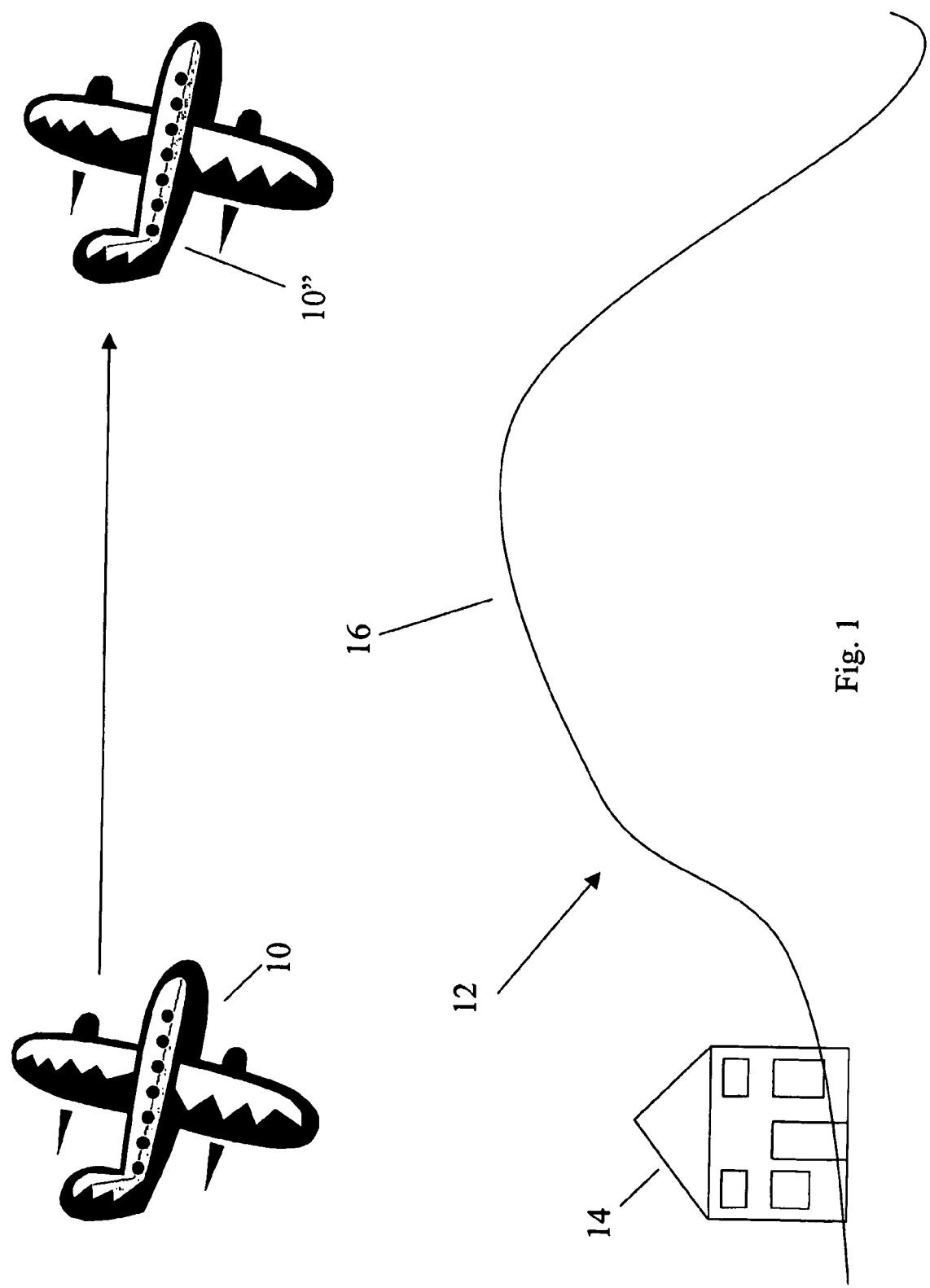
FIG. 1 is a simplified diagram showing an aircraft carrying out a survey of a scene.

The present embodiments comprise a system for utilizing three dimensional data in stereoscopic images to confirm or eliminate changes apparent from the two-dimensional data of the same images. The system comprises improved methods of registration of images both in two dimensions and in three dimensions, and improved methods of removing bias to enable a reliable three-dimensional comparison to be made. Furthermore the preferred embodiments use an ordered system of filtering for changes which has the consequence of restricting the more processor-intensive parts of the comparison process to change candidates already filtered by less processor-intensive stages.

The principles and operation of a change detection system according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Reference is now made to FIG. 1, which is a simplified diagram illustrating an aircraft 10 passing over a scene 12 comprising a building 14 and a hill 16. The aircraft preferably takes a first photograph in position 10 and a second photograph from a second position 10' which it reaches a short time later. The two photographs are of the same scene 12 and can be combined to form a stereogram. Alignment between the two photographs is conventionally carried out manually by identifying distinctive points in the two images, known as control points. The idea of a stereograph is that, since the two photographs are taken from different angles, the angular information can be used to obtain three-dimensional, that is height-depth information of the scene.

As mentioned in the background, the photographs are not maps. Maps have a constant scale throughout whereas photographs have perspective, so that scales recede into the distance. However, it is possible to compensate mathematically for the perspective and to create what is known as an orthophoto. For much less processing power it is also possible to align a newly taken photograph over a reference orthophoto and achieve the same result. Alignment for this purpose is again conventionally carried out using control points.

A stereogram can also be used to obtain a digital terrain model. Contour information can be obtained from the stereogram to create a three-dimensional landscape. The digital terrain model as such ignores non-terrain type features such as buildings, trees and the like although these can be superimposed later on as desired.

A use for aerial photography is to detect change. An aircraft conventionally takes photographs at two separate times and then the photographs are compared to find changes that have occurred in the meantime. Initially all such change detection was carried out manually, but image processing can be used provided that suitable alignment is carried out between the present and previous images. To date, whilst three dimensional stereogram-based imaging is often used for reconstruction of features on the ground such as topography, buildings and the like, change detection appears to rely exclusively on two dimensional photography. The reasons lie both in the difficulties experienced in aligning three-dimensional images, and in the complexity of carrying out comparisons on the resulting three-dimensional data, in particular the processing cost involved in carrying out three-dimensional comparisons.

In the following, methods and systems are disclosed that allow for three-dimensional depth information to be used to detect changes in successive images.

Figure 2:
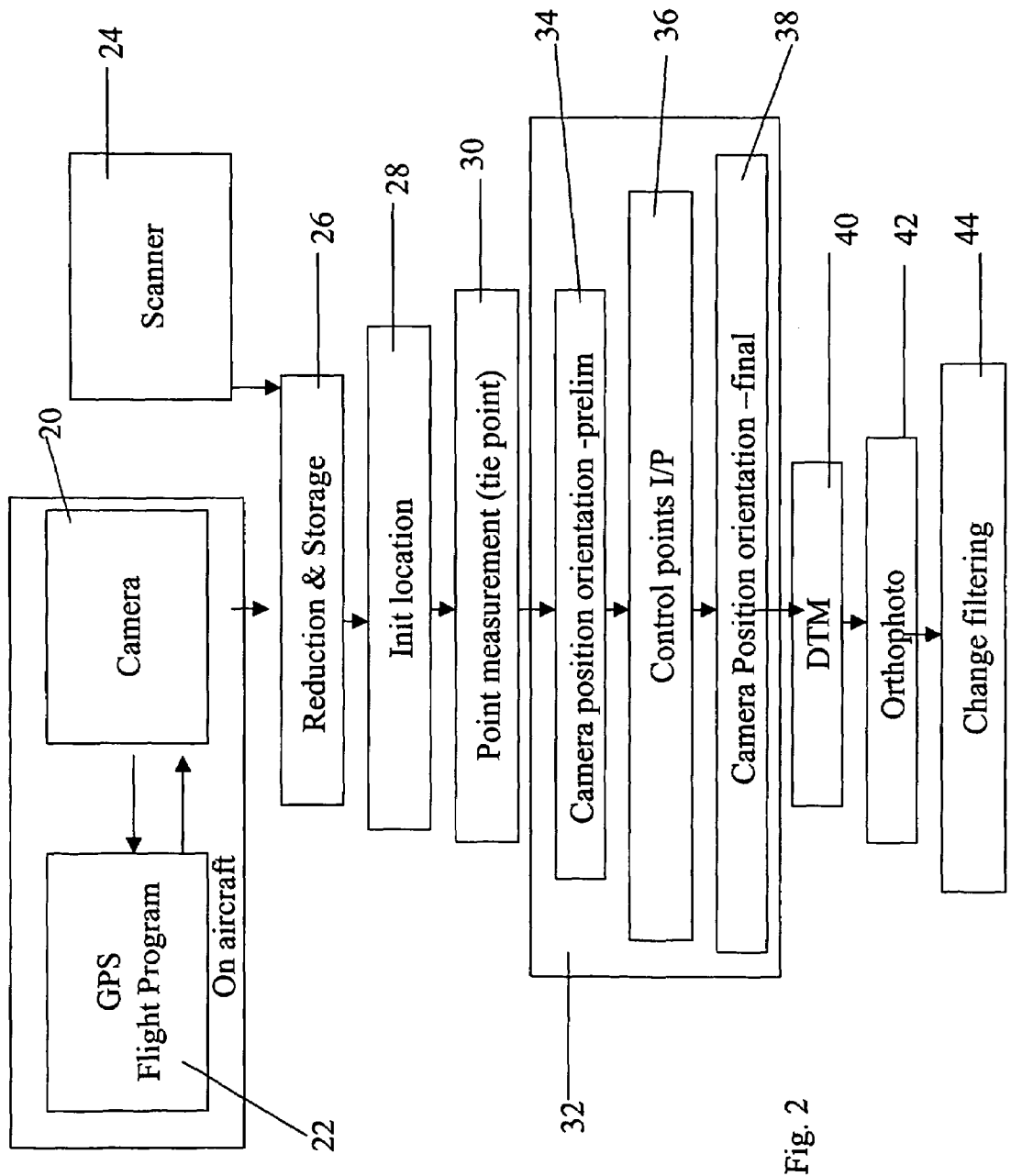
FIG. 2 is a simplified functional diagram showing a method of obtaining and processing aerial images for automatic change detection according to a preferred embodiment of the present invention.

A preferred embodiment of the present invention includes the methods and algorithms for processing and analysis of digital (or digitized) aerial images. The presently preferred embodiment enables a series of operations which take the stereogram pairs as initial input and produce a candidate list of changed features as output. An overview of the system is shown in FIG. 2.

Images are preferably obtained from a camera 20, and preferably the camera is combined with a positioning system such as the global positioning system GPS 22, so that a location at which the photograph was taken is available to a certain level of accuracy. However the accuracy available on GPS, at least currently for civilian use is only about 10 m with a signal once per second. For an aircraft traveling at relatively high speed this does not provide enough accuracy to be the basis for effective alignment. That is to say the GPS rate sampling is one sample every second, whilst typical aircraft speed is in the range of 15-50 m/sec.

In order to reduce the location uncertainty that direct use of the GPS signal provides, the preferred embodiment makes use of a virtual ground speed and location simulator to augment the GPS based location. The simulator is synchronized to GPS location measurements, and predicts a new up to date location since the last GPS measurement, using its own information of the current flight path to a new virtual location.

Image import—an initial processing stage 26 transforms the input images as received from the camera into a form suitable for the following processes. In one version that format is the Vitec standard. The conversion includes pixel reduction based minimization, which creates an image pyramid for each input image. Each image pyramid consists of a sequence of replicas of the original image, where each image in the sequence is a decimation of factor 2 of the previous one.

An initial location stage 28 is an automatic stage which is described in greater detail below, and which involves a 3 D Correlator. The correlator is used for initial location based on overview low-resolution mosaic, in order to improve the location data of the GPS system. The output of stage 28 includes camera location e.g. x y z and flight azimuth.

A so-called Init Location algorithm is used, which is a correlation process between a reference geo-located orthophoto and an input image from the system sensor. The input to the init location process are the coarse location and alignment parameters of the current input image (x, y, z, Omega, Phi, Kappa), and the output comprises more accurate parameters (x, y, z, Kappa). The Omega and Phi parameters are unchanged, and assumed to be zero, for vertical photographing.

The preferred algorithm work as follows:

The input image is rotated in increments of 10 degrees. At each step the image is correlated with the reference. The maximum correlation is selected, and then the altitude is changed in steps of 10 m, again to find the maximum correlation. The process continues in increments of 10 m. The maximum correlation is selected to be the altitude and Kappa is set, assuming that Omega and Phi are zero. The output data is saved in FLT file.

Tie point measurements—In a following stage 30, a point measurement stage 30 provides for location of corresponding points in the overlapping sets of images, now that an initial alignment has been carried out. Automatic tie point measurement is a preliminary part of the Triangulation process which follows, which involves finding the true parameters of the camera location and orientation, and the spatial orientation for each image. Pairs of tie points are located within the overlapped area of pairs of images. The location of the tie points is based on cross correlation computation within small image windows, as will be explained in greater detail below.

Triangulation solution—a triangulation solution stage 32 involves computation of the camera locations and orientations for all the images. Initial and final results are obtained in separate stages 34 and 38, in between which a stage of inserting control inputs 36 is inserted. In stage 34 the parameters of the camera are estimated by solving a set of equations based on the detected tie points.

Control points input—stage 36 is an interactive input stage of geodesic control points as measured on the ground. A set of four control points (minimum) is required in order to compute the earth coordinates of the image mosaic. The control points are points on the ground for which there are measured earth coordinates, including height. The points are marked in a way that enables to interactively locate them in the images. Then, in stage 38, the location and orientation of the camera for each image is recomputed based on the control points.

Digital Terrain Model (DTM)—stage 40 involves computation of the DTM based on the stereoscopic information in the overlapping images. The DTM is computed based on the stereoscopic information of the overlapped areas of pairs of images. It is required that there is an overlap between the images of about 60% in order to obtain the DTM.

Mosaic generation—an orthophoto stage 42 comprises combining the images into a rectified (Orthophoto) mosaic. Calculation of the orthophoto from the stereoscopic images requires the camera location and the DTM.

A change filtering stage 44 involves using the 2D and 3D information from the DTMs, the stereograms, the orthophotos and the original images, to find possible changes between before and after images and successively filter the possible changes into a set of highly probable changes. The initial filtering stages involve both change detection which is the detecting and measuring of changes between Orthophoto mosaics of the same target, taken at different times and different light conditions, and change classification which is classifying of the detected change as belonging to a natural scene or to a man-made target.

Typically, two-dimensional change data is initially obtained from the aligned photographs and then the changes are retained as being significant if they correlate with changes in the three-dimensional topography at the given location.

Preferably the aircraft carrying out the survey is equipped with a system that enables survey planning, and that permits guidance of the aircraft over the appropriate ground track, and at the correct altitude. At planned locations according to the mission plan, the system preferably activates automatically the photography system. A typical photography system for this kind of activity is typically based on the following elements:—

Digital Electro-optical camera;

Payload Stabilizer Mount; and

Storage capability for storing the image files from the camera together with position data from the Navigation Guidance & Control System.

Figure 3:
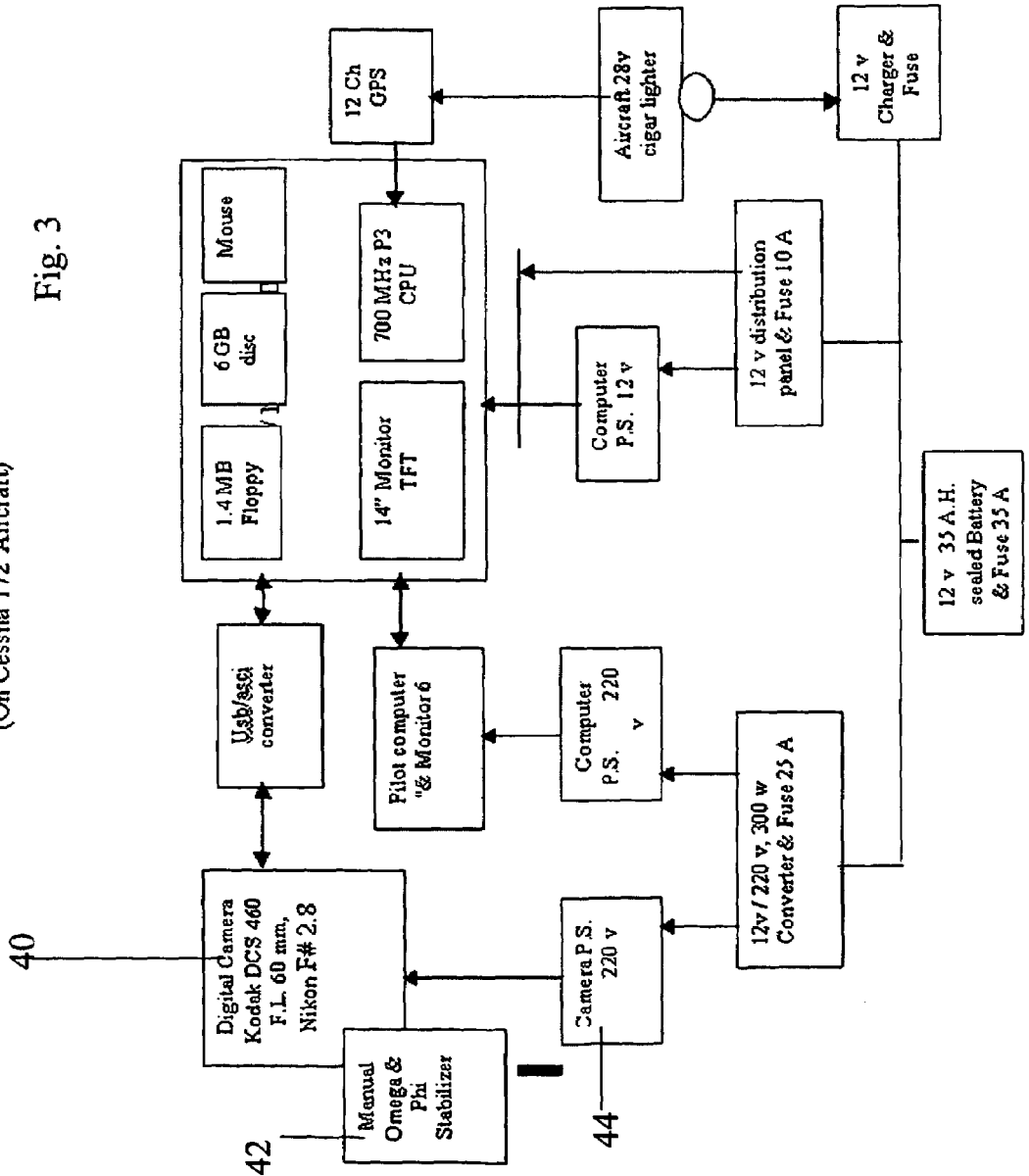
FIG. 3 is a simplified block diagram illustrating an aircraft on-board photography system for use with the present embodiments.

A prototype system is shown in block diagram form in FIG. 3, and is specifically designed to be installed on the Cessna 172 light Airplane.

The Prototype system includes a camera 40 which is installed on a manually stabilized rigid stand 42. A Payload Stabilizer 44 further improves performance. Other features shown in the block diagram are well known to the skilled person and are not explicitly explained.

Digital aerial photography according to the present embodiments is based on a series of software building blocks and complimentary software modules. The software elements may be adapted and integrated as a system to fulfill the desired operational functions and tasks. The software may for example run on PC-type computers on ground and on board. The programs used in the current prototype are written in c++ and visual basic.

As mentioned, a survey requires mission planning, and such planning may be executed by a mapping program. In an embodiment, the operator marks on a map using the ground computer, an area to be photographed. The borders of the marked area are then input to a following stage which computes best photographing locations and flight paths, using additional input parameters such as resolution, overlap etc. The output file of the mapping program is a list of locations to be photographed by the airborne equipment.

The output file is preferably tested and validated on the ground computer using a simulation mode. In simulation mode on the ground, using a virtual aircraft, one can test all the planned photographing locations, using any aircraft speed and direction.

Following simulation and validation, the output file and any changes thereto, are loaded to the airborne mission computer. A corresponding program on the aircraft computer reads the output file and marks graphical directions for following the required path on screens of the operator and pilot.

Once the aircraft location is close to a planned photography point, the program sends a software command to the digital camera to take a photograph. The resulting digital image is stored in the mission computer disc combined with the navigation parameters—position and direction azimuth.

In one embodiment the navigation data is retained as follows. For each survey mission there is preferably a file of navigation data. After each "Take Picture" command, a current line of navigation data (location, speed, direction, time) is written to this file. Each picture has a time tag in the image file.

On the ground, image and data files from the mission computer are loaded to ground station computer database. The navigation data is merged with the image file to allow post processing of data to be based on time location and flight data of each image.

The post flight processing of the data follows the procedure outlined in FIG. 2 to stage 42 which provides the orthophoto mosaics, as explained above.

The following stage 44, of Stereo Change Detection is based on the orthophoto and stereo mosaic data.

In the stereogram itself, which is made of two photographs of the same or at least overlapping images which incidentally are taken one after the other, the stereo affect disappears when an object is missing or changed. This objects which move or disappear in the short term can easily be spotted.

The above-described capability is useful for detection, in real-time, of moving objects (dynamic change detection mode), and allows them to be distinguished from changes that occur during the period between the two photography sessions, which still appear as three dimensional objects in the individual stereograms (static change detection mode).

Figure 4:
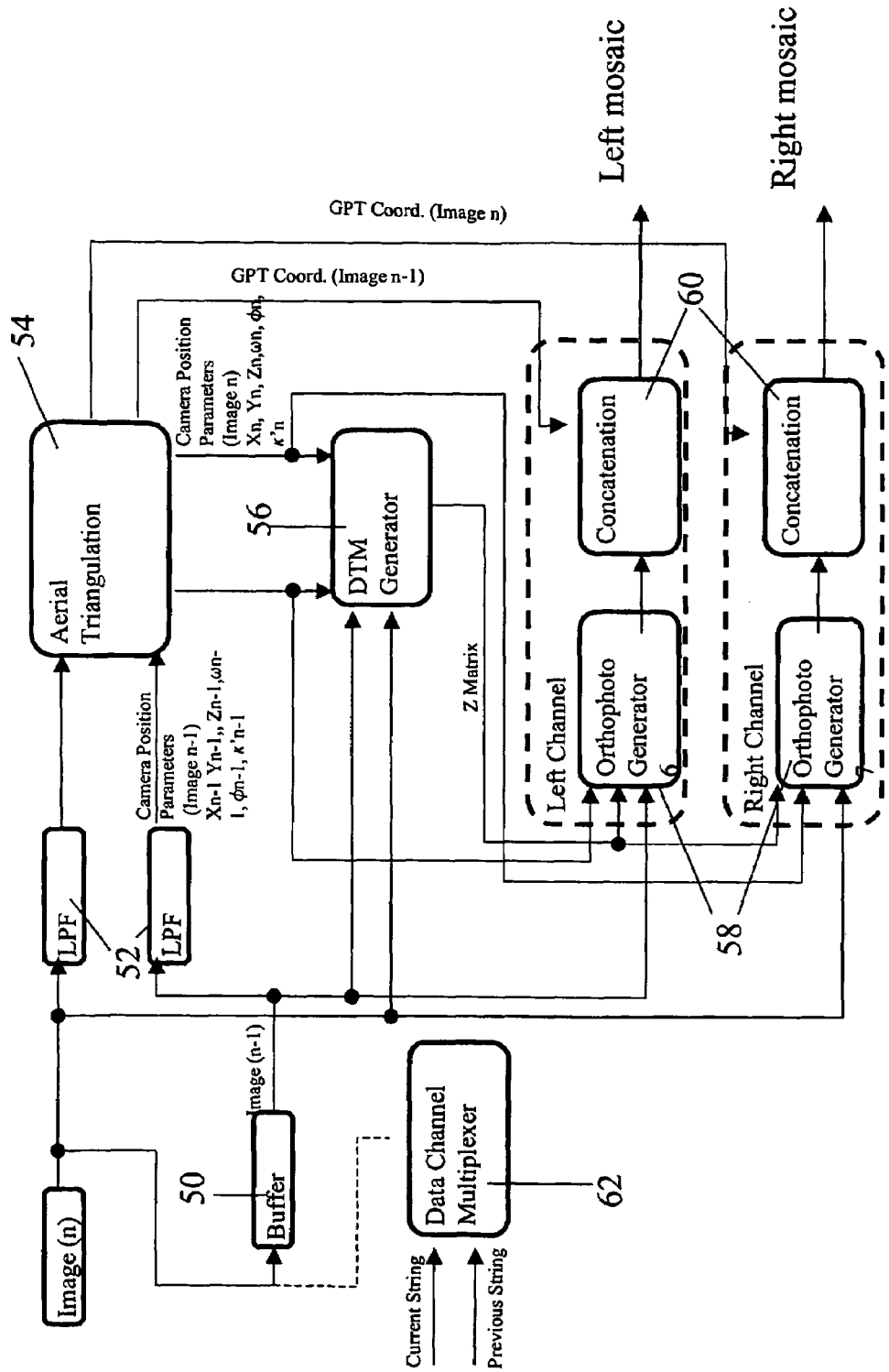
FIG. 4 is a simplified block diagram illustrating the formation of left and right three-dimensional mosaics according to a preferred embodiment of the present invention.

Reference is now made to FIG. 4, which is a simplified block diagram illustrating apparatus for processing an image obtained from aerial photography for the purpose of change detection. The apparatus comprises a Buffer 50 for storing a single image or photo, two low pass filters 52, an aerial triangulation unit 54, a digital terrain module computation unit 56, Two identical units 58 for Orthophoto generation, two identical units 60 for concatenation, and a data channel multiplexer 62 which operates in the case of static change detection.

The apparatus of FIG. 4 may be used for dynamic change detection as follows: A current frame is received and is processed together with the previous frame in buffer 50. The two frames are passed through the low pass filters 52 to aerial triangulation block 54. In triangulation block 54, camera location computations are performed for each of the two frames including (x. y. z.) coordinates and ($\omega.\phi.\kappa.$) angles. At the same time, computations are made to determine co-ordinates of the center of each photo. Using the low pass filter 52 prior to aerial triangulation 54, as shown herein, improves the stability of the results.

Subsequently, the triangulation parameters are transferred to DTM generator 56 which calculates surface heights using Z matrix computation for 10-20 points at each direction within the overlap area of the two photos. As a result a DTM is constructed.

Based on the DTM and camera location data, Orthophotos may then be created for each of the frames. Preferably, the height points used in the previous calculation are at low density, so that constructing the Orthophoto requires making corrections only for wide areas. At the same time, on smaller areas and on the objects subject to the changes being looked for, the correction made to the wide areas applies automatically, so the stereo effect is not disturbed.

Subsequent use of the data allows changes to be readily apparent. For example no change will be detected on a hill or road, for which no three-dimensional change is to be found. However, a change in a small object such as a person, a vehicle or a house is readily apparent.

In the concatenation unit 60 the two frames are added to the existing mosaics, one to the right and the second to the left.

Static detection operates in the same way as dynamic change, with one exception. In static detection, prior to the data processing, previous and present frames that share the same GPS location data are transferred to Data Channel Multiplexer 62, in a specific order, each even photo comes from the present, each odd photo from the previous for the purpose of comparison, as will be explained in greater detail below. Aside from multiplexer 62 the process is the same as in the Dynamic change detection mode described above. The static detection process is explained in greater detail below.

Figure 5:
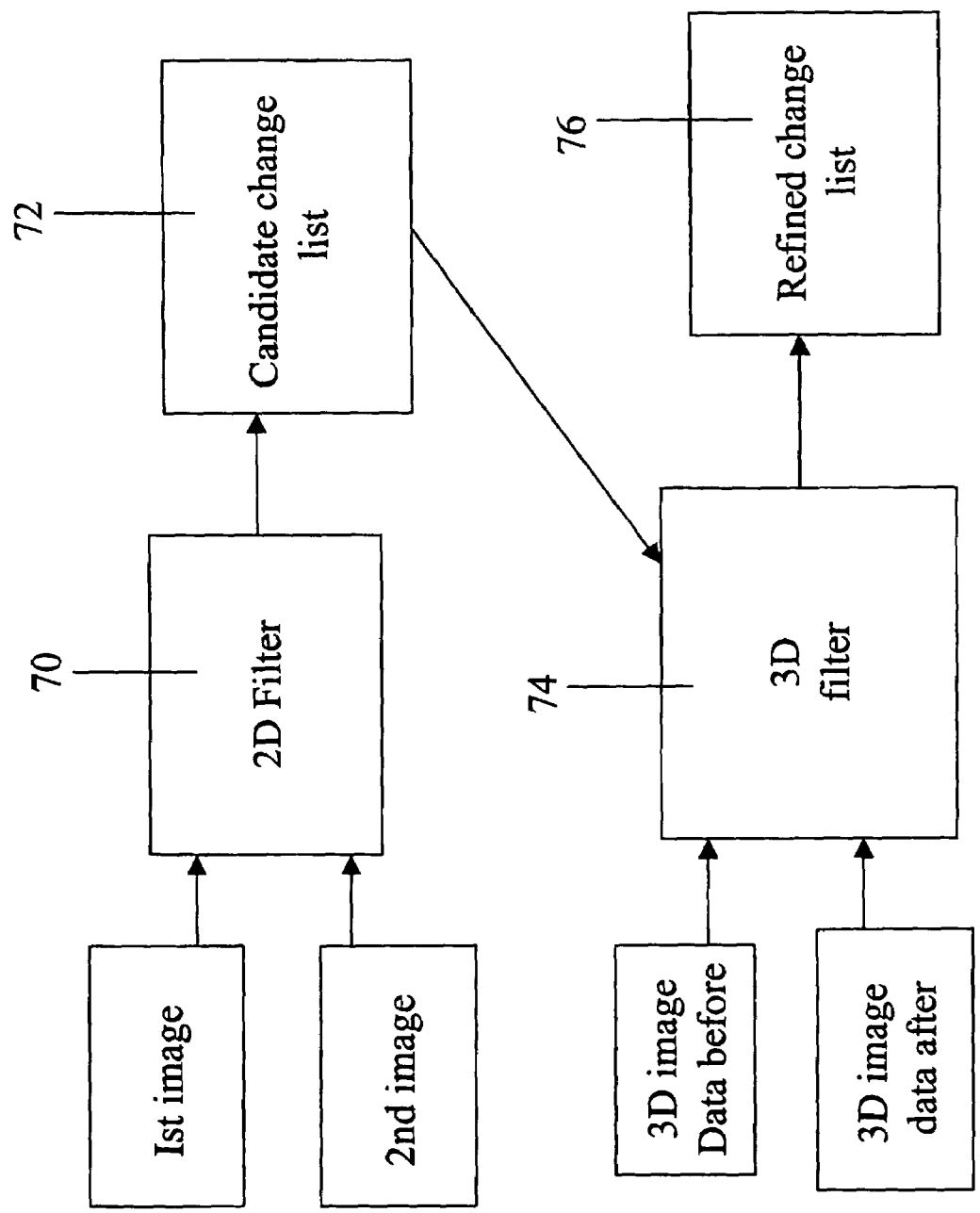
FIG. 5 is a simplified block diagram illustrating the use of three-dimensinal change information as confirmation for two-dimensional change information.

Reference is now made to FIG. 5, which is a simplified diagram illustrating change detection apparatus for detection of changes between first and second stereoscopic image pairs obtained at different times of a substantially similar view, according to a preferred embodiment of the present invention. As shown in FIG. 5, a two-dimensional image filter 70 is provided for comparing the first and second image pairs to obtain an initial list 72 of change candidates from two-dimensional information in the image pairs. In addition, a three-dimensional image filter 76 compares 3D information of the first and second image pairs at the locations of the change candidates. The 3D filter uses the available three-dimensional image information in the image pairs to identify those of the 2D change candidates that are accompanied by a volumetric change. Thus a change identified in the 2D information may simply be shadow changes due to the photo being taken at a different time of the day. However such shadow changes are not accompanied by any volumetric changes and thus the 3D filter allows such a change candidate to be eliminated. The result is the retention of change candidates which do correlate with three-dimensional image change and the rejection of those change candidates which do not correlate with three-dimensional image change. The retained change candidates thus constitute a refined list of change candidates which is of manageable proportions and which can confidently be passed on to a human analyst for final judgement.

The two-dimensional filter may use color information in its comparison of the before and after images. Additionally or alternatively it may use texture information.

As discussed above in connection with static and dynamic modes, change due to motion of within the scene is preferably filtered out, since it is not really change in the scene. Motion filtering does not need three-dimensional information. Rather the two-dimensional images of the before and after stereograms are compared and any object that does not appear in the same position in both halves of the same stereogram is assumed to be moving and eliminated from the candidate list.

Figure 6:
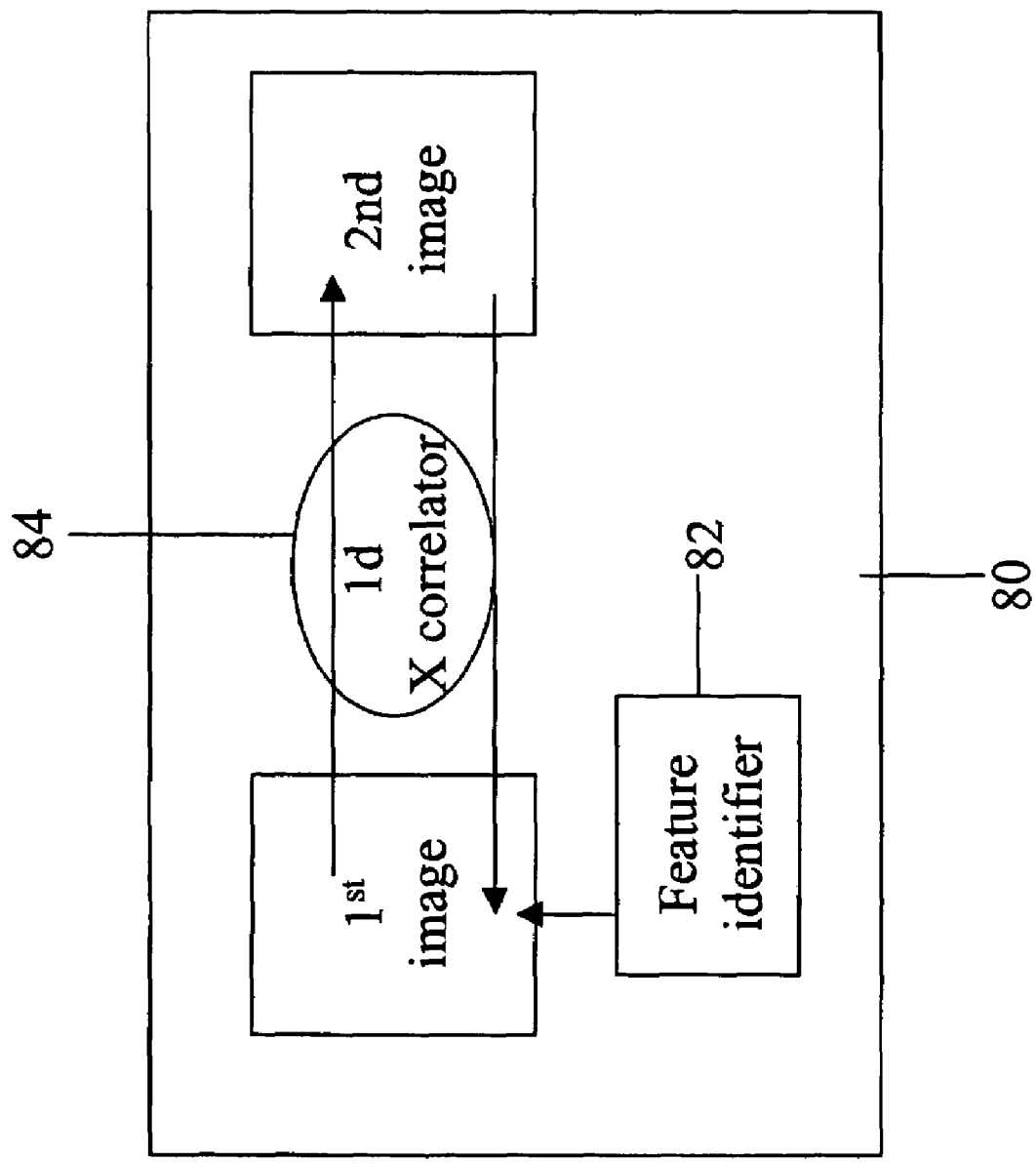
FIG. 6 is a simplified block diagram illustrating epipolar filtering according to a preferred embodiment of the present invention.

Reference is now made to FIG. 6, which is a simplified diagram illustrating an alignment unit 80 which provides for alignment of the images to allow filtering. The comparisons that the filters carry out rely on effective alignment in two and three dimensions. Whilst manual alignment is possible, the alignment unit 80 provides a reliable way of automatic alignment based on the identification of tie points, that is identifying corresponding features in the before and after images for aligning with each other. A problem with automatic identification of features is that nearby but not actually corresponding features may be accidentally identified. In order to avoid such an eventuality, the alignment unit 80 a tie point unit or feature identifier 82 identifies a first image feature on one of the images. A one dimensional cross correlator 84 then carries out one-dimensional cross-correlation to find the corresponding image feature, on a second of the images. Once the corresponding feature is found, the cross-correlator 84 carries out a reverse one-dimensional cross-correlation from the corresponding image feature to find the first image feature. The idea is that if a neighboring similar feature has been erroneously chosen the reverse cross-correlation will not work.

In the above, alignment is made on the basis of a two-dimensional map, however, in order for successful identification of change in the volume information it is necessary to consider alignment on the basis of the volume information, at least around the change candidates themselves. Two preferred embodiments are disclosed herein, one, involving averaging, is described in relation to FIG. 7 and the other, illustrated in FIG. 8, works on the principle of forcing and uses tie points.

Figure 7:
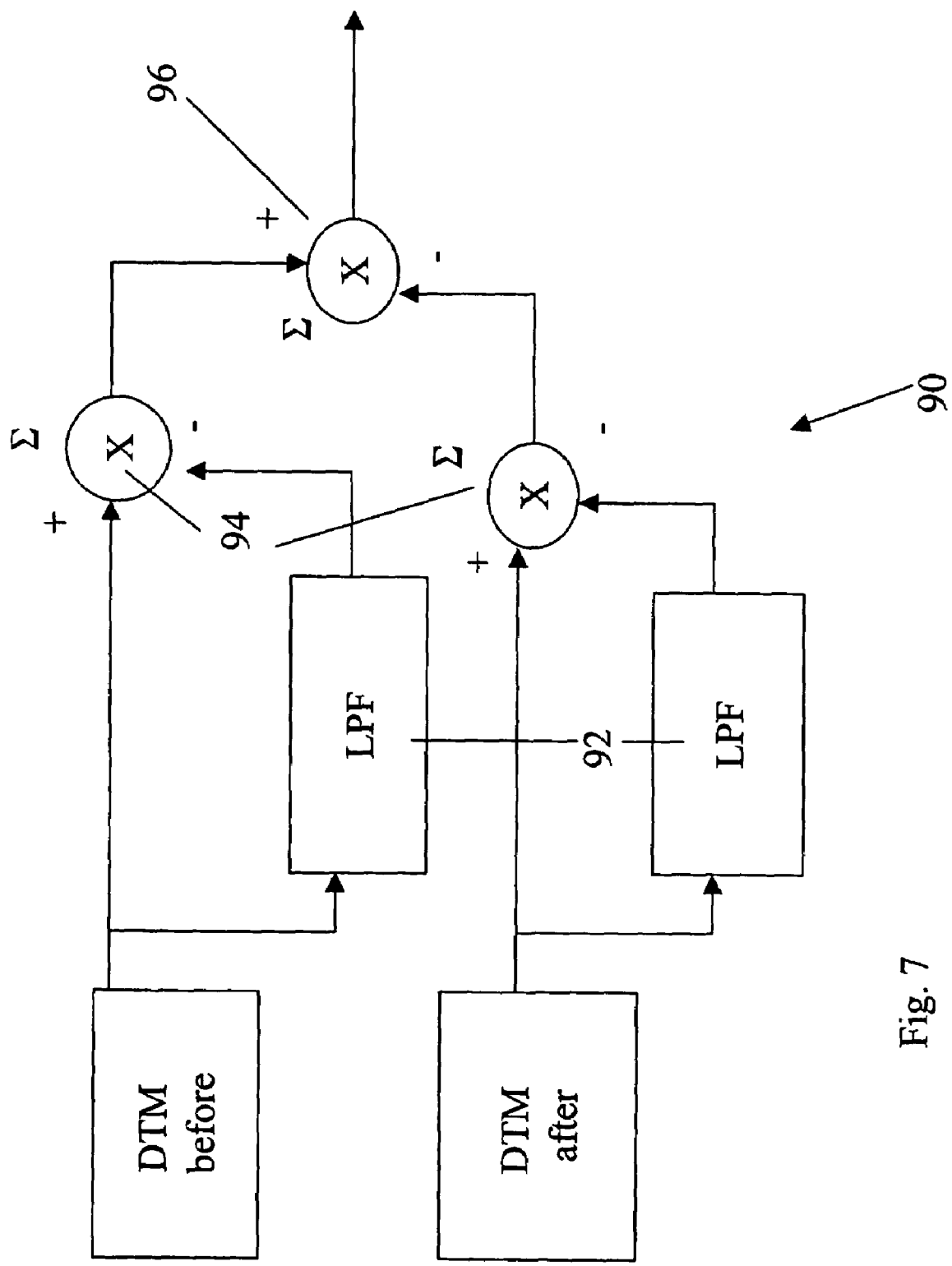
FIG. 7 is a simplified block diagram illustrating an averager for removing DC bias from successive 3D images or digital terrain models.

In FIG. 7, the digital terrain models are used as starting points. Often the height information contains DC bias and other errors. In FIG. 6 an averaging arrangement involving two low pass filters 90, two preliminary summation units 92 and a final summation unit, sets the averages over the before and after DTMs to the same value. The result is a pair of height aligned DTMs in which comparisons between heights at a given point are meaningful since all bias has been eliminated. The volume information and the changes therein, appear as AC information.

Figure 8:
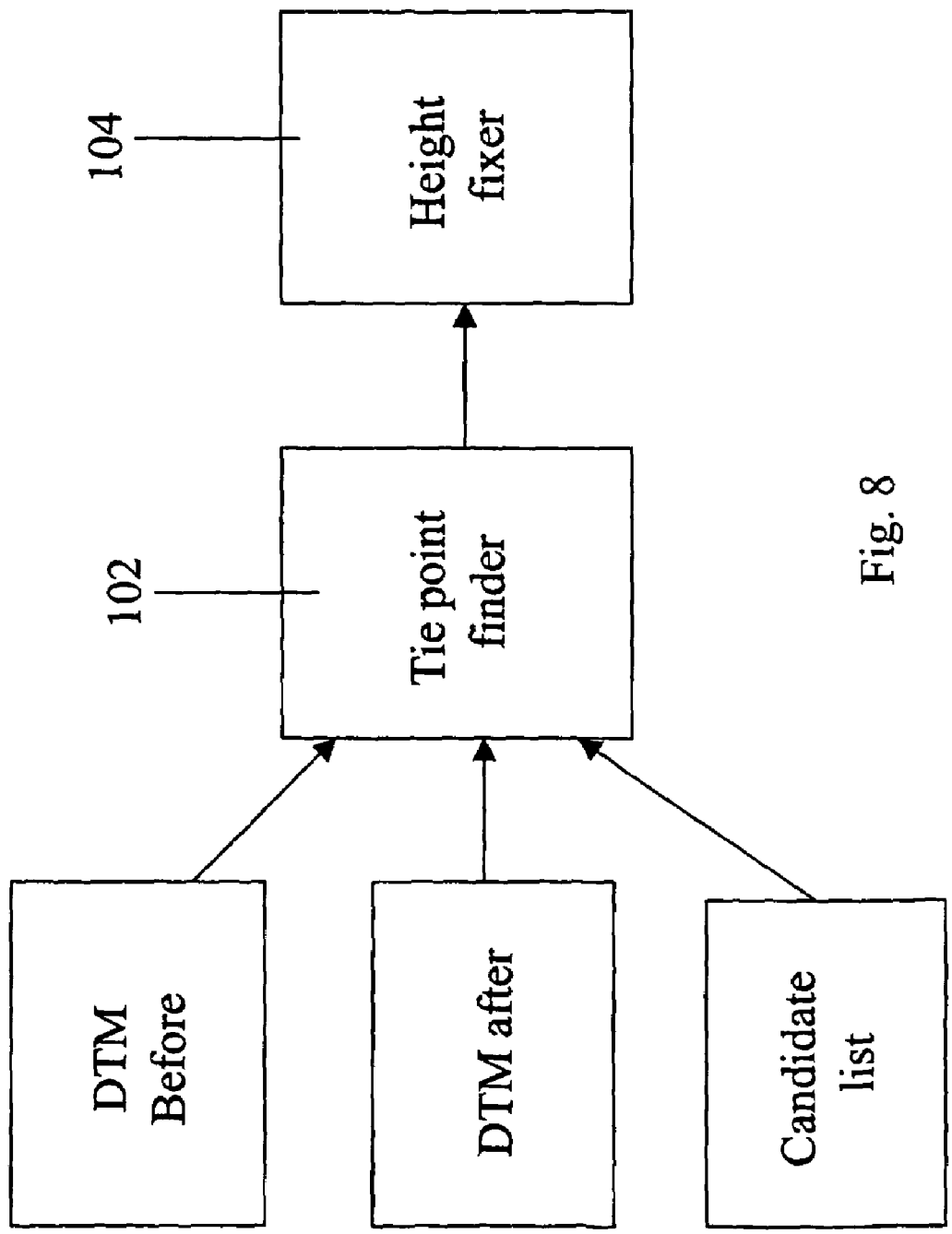
FIG. 8 is a simplified block diagram illustrating an alternative apparatus for removing DC bias from successive digital terrain models.

Reference is now made to FIG. 8 which illustrates an alternative method for providing height alignment. In FIG. 8, a tie point identifier 102 finds corresponding points around the candidate change points. A height fixing unit 104 then sets the heights as far as possible at the tie points to be the same for the two DTMs, so that any height difference within the tie points is solely attributable to actual change between the taking of the photographs.

Figure 9:
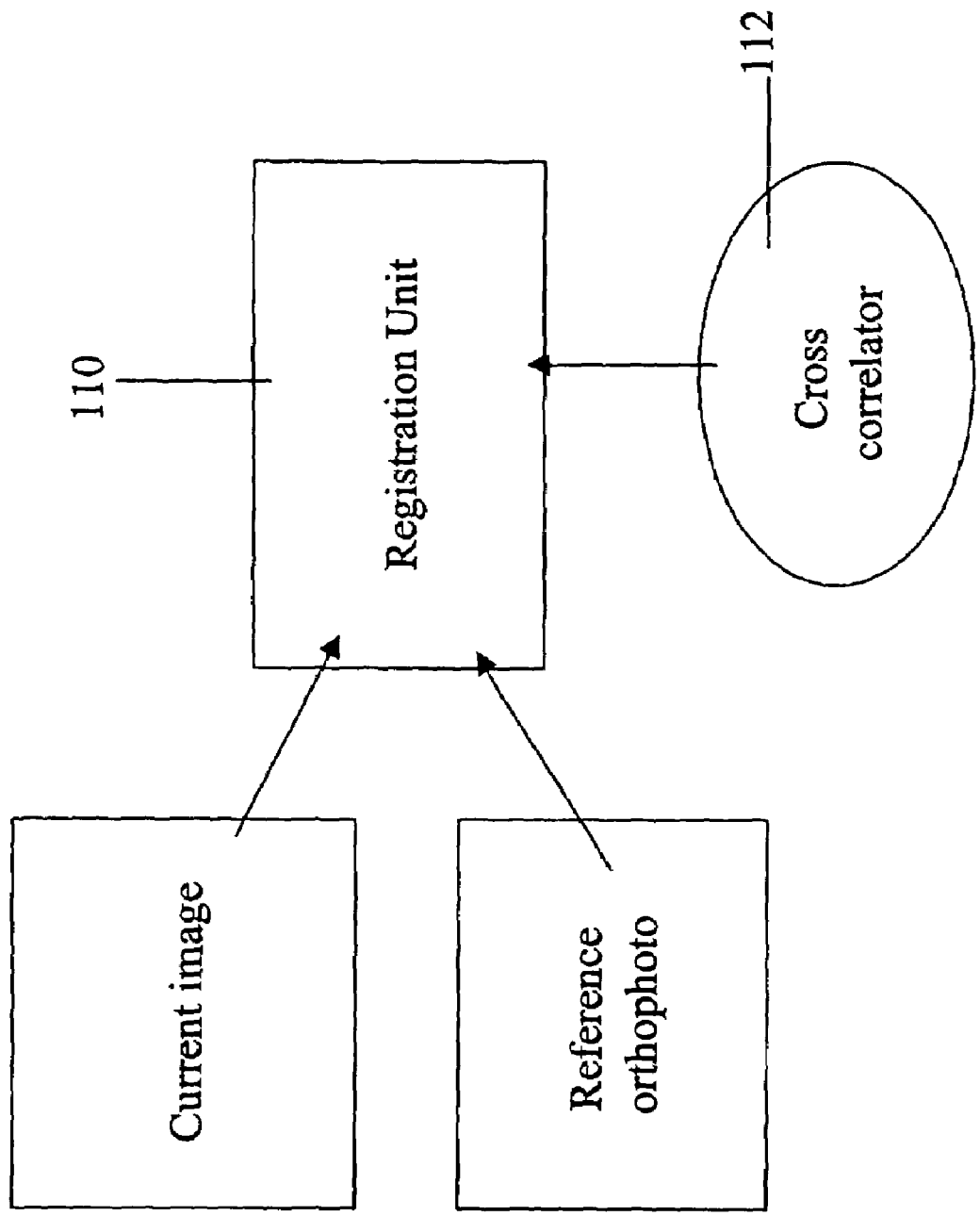
FIG. 9 is a simplified diagram illustrating apparatus for registering a current image over a reference orthophoto according to a preferred embodiment of the present invention.

Reference is now made to FIG. 9, which is a simplified block diagram illustrating an alignment arrangement for aligning photographs with a reference orthophoto. The arrangement comprises a registration unit 10, and a cross-correlator 112. The registration unit makes an initial registration attempt between the aerial photograph, or more typically a reduced version of the photograph and the reference orthophoto, based on a first tie point.

Subsequently a first cross correlation is made between the two to obtain a first correspondence measure.

Subsequently a registration parameter is changed, say the angle of alignment or the height, resulting in a new registration attempt. Then a further cross correlation attempt is made leading to a further correspondence measure. The process is repeated several times, and two or more different parameters can be used, say angle and height. The two parameters can be altered alternately or one after the other or in any other way. Finally, the alignment giving the highest correlation is selected.

Whichever parameter is used can be changed stepwise. Thus if the parameter is angle then the angle can be changed say in one degree steps over a total range of ten degrees to find the best correlation. If the parameter is height then the height can be altered in say one meter steps over a range of a hundred meters until the best correlation is found. For improved accuracy the entire process can be repeated for a second, third and even a fourth tie point.

For even greater accuracy it is possible to follow contours along the diagonals between the four tie points. If the contours match between the two DTMs, then this is an indication that the alignment is of high quality.

Figure 10:
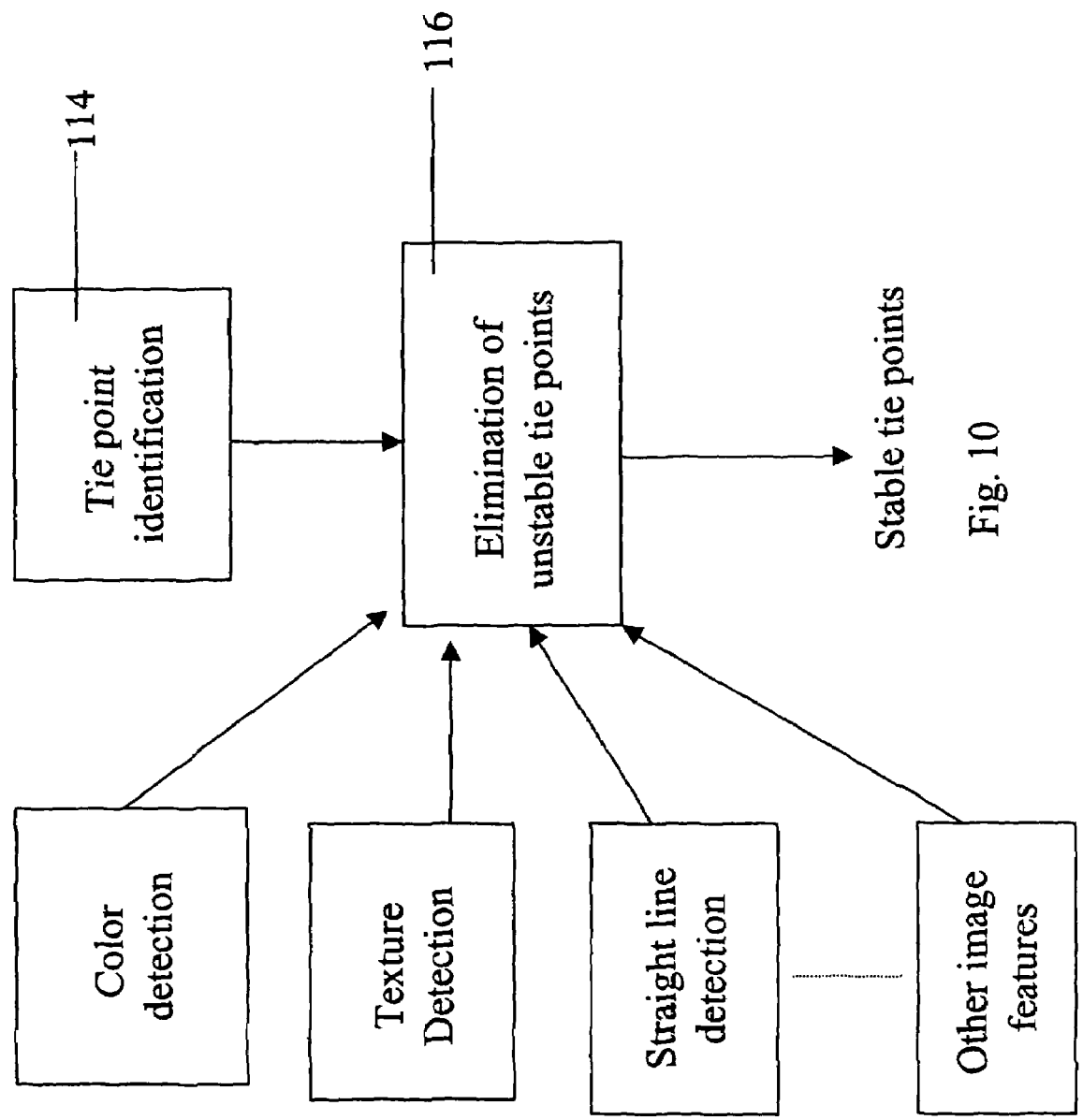
FIG. 10 is a simplified block diagram illustrating apparatus for identifying stable tie points for use in image registration according to a preferred embodiment of the present invention.

One known weakness of automatic alignment systems is that, whereas human users can recognize unstable features as not being suitable for use as tie points, say plant material or a vehicle, computers are generally just as likely to choose unstable as stable features for this purpose. The preferred embodiments thus add a feature classifier to the tie point identification. Reference is now made to FIG. 10 which shows a classifier 114. Classifier 114 takes suggested tie points from a tie point identifier 116 and attempts to classify them in any way it can. Classification may be on the basis of image recognition, thus if the feature is recognized as a vehicle it is classified as unstable, but if it is recognized as a building then it is classified as stable. Color information may be used, thus greenery may be classified as unstable whereas grey, indicating rocks, or brown indicating earth, may be classified as stable. Sometimes recognition may be definitive, sometimes it may be tentative, and thus rather than using a single recognition method, a number may be used, each contributing to a stability index. The final total of the index may then be used to classify the object as being stable and therefore suitable as a tie point, or unstable and thus unsuitable.

Generally the idea of registration of images is to take the prior photographs and use them as a reference set, and to register the new photographs over the old ones bearing in mind that the new photographs may have been taken from a different angle or a different altitude or under different lighting conditions etc. The new photographs are typically processed to fit onto orthophotos derived from the prior photographs.

Figure 11:
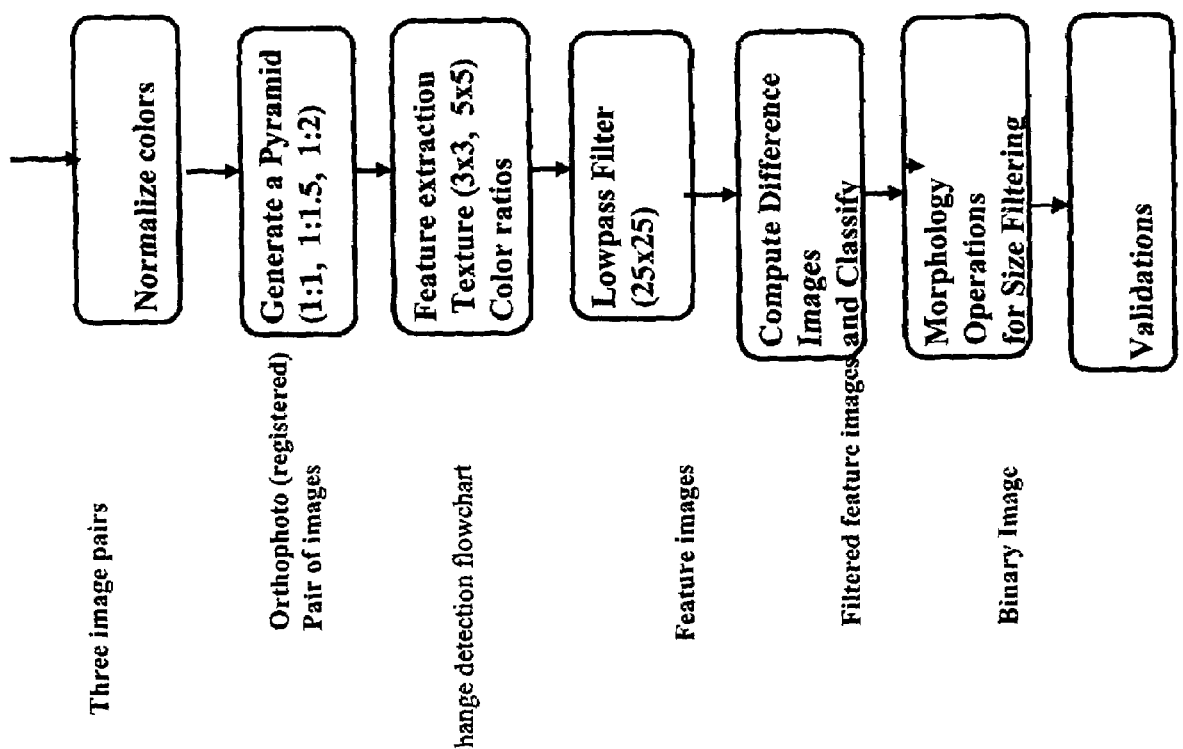
FIG. 11 is a simplified diagram illustrating two-dimensional change detection according to preferred embodiments of the present invention.

The overall aim of change detection is to detect changes between pairs of images of the same target, taken at different times and to refine the detected changes to produce a final set of changes that includes all changes of significance and as little as possible of insignificant changes. The algorithm is thus designed to ignore changes due to illumination variations and differences in shadows. The input to the change detection operation includes an orthophoto of the initial period and images of the second period, preferably registered over the orthophoto. For registration, the combined data is analyzed using the tie-points of the initial period as control points for the second period. Out of the combined data two mosaics with height data are derived; for the initial period and the second period respectively. A flow chart for the change detection process is shown in FIG. 11, which begins with a process of color normalization. Color normalization is discussed algebraically below but involves compensating for brightness and like temporal effects on the color so that colors can be compared. Color normalization is followed by pyramid generation, as mentioned above, which is an operation carried out on the result of superimposing the current images on the reference orthophotos generated from the previous images.

Following pyramid generation, there is a feature extraction stage in which color and texture information is extracted from the before and after images. These are low pass filtered and a difference image is then computed based on the texture and color information. The differences are classified using other available information, in particular including volume information. Finally the changes are either validated or invalidated as being significant changes.

Figure 12:
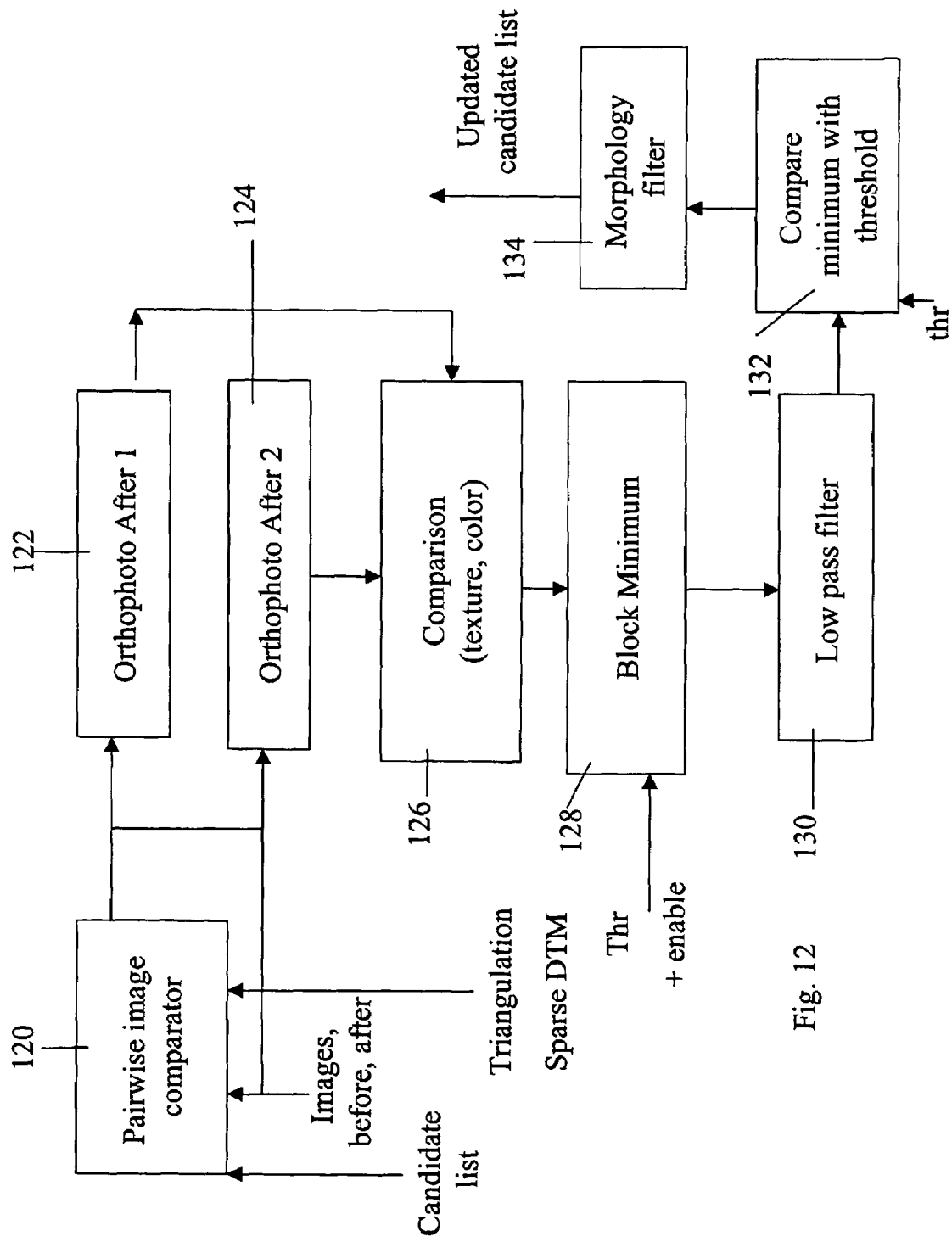
FIG. 12 is a simplified diagram illustrating dynamic movement detection according to a preferred embodiment of the present invention.

Reference is now briefly made to FIG. 12, which is a simplified block diagram illustrating an apparatus for carrying out dynamic change identification, that is for excluding moving objects from the comparison. The figure is discussed at this point because it uses two-dimensional information in its comparison. In FIG. 12, a pairwise image comparator 120 firstly matches up candidate changes from the before and after images. Then orthophotos of both the before and after images are buffered in first and second orthophoto units 122 and 124 and two-dimensional changes between all four of the two dimensional images are evaluated in comparison unit 126. Then a block minimum unit 128 finds which of the four comparisons gives a minimum. Low pass filter 130 then leads to thresholder 132 which excludes the change if the minimum comparison is below the threshold. This indicates a moving object rather than a static object which has changed. Finally a morphology filter removes noise, as will be explained below.

In the following, filtering according to texture, as used in a preferred embodiment of the present invention is discussed.

The textural features used here were proposed by Law and are defined as follows:
Consider the following 3 vectors:
L3=(1,2,1) Averaging
E3=(-1,0,1) Edges
S3=(-1,2,-1) Spots
The outer products of pairs of these vectors may be used to form 9 masks. Denoting the masks by
M3j, j=0,1, . . . , 8.

$$M30 = LtL = \begin{matrix} 1 & 2 & 1 \\ 2 & 4 & 2 \\ 1 & 2 & 1 \end{matrix} \quad M31 = EtE = \begin{matrix} 1 & 0 & -1 \\ 0 & 0 & 0 \\ -1 & 0 & 1 \end{matrix} \quad M32 = StS = \begin{matrix} 1 & -2 & 1 \\ -2 & 4 & -1 \\ 1 & -2 & 1 \end{matrix}$$

and so on.

The mask M30 is used for normalization.

Let F and G be a pair of registered Orthophoto images.

Let $FM3j$ and $GM3j$, j=0, 1, . . . , 8 be the convolution of the respective image and the respective mask.

Let $B=FM30/GM30$ be a brightness normalization coefficient.

We now define a relative change measure in the following manner:

$$C^t = \sum_{j=1}^{8} (|FM_{3j} - GM_{3j} * B|) \bigg/ \sum_{j=1}^{8} (|FM_{3j}| + |GM_{3j} * B|).$$

Now considering color filtering, as the skilled person will be aware, color is typically held in each pixel of a digital image a triplet, typically of red, green and blue (R, G, B) values. A parameter for defining a Color Ratio Feature can be calculated for corresponding pixels in the before and after images according to a formula as follows:

$$C^c = K\sqrt{(R_r/S_r - R_t/S_t)^2 + (G_r/S_r - G_t/S_t)^2 + (B_r/S_r - B_t/S_t)^2},$$

where: K-scale coefficient for compatibility with textural features;

$R^r$, $G^r$, $B^r$—values of primary colors for the reference or prior image;

$R^t$, $G^t$, $B^t$—values of primary colors for the test or after image;

$S^r = \sqrt{R_r^2 + G_r^2 + B_r^2}$;

$S^t = \sqrt{R_t^2 + G_t^2 + B_t^2}$.

Feature Selection, or the inference that a textural feature is present, may be performed for every pixel according to a homogeneity measure within the pixel vicinity. The homogeneity measure H is calculated as follows:

$$H = \max(|FM^{31}|, |GM^{31} * B| \ldots |FM^{38}|, |GM^{38} * B|).$$

where all the parameters are as defined above.

If the value of H for the current pixel is more then a specified threshold, the textural features are used. If the value of H is less than the threshold, the colors ratio features are used instead.

Calculation of the features is performed on the original image, and on replicas of the image obtained by decimation with factors of 1.5 and 2. The features computed for the three resolutions are respectively interpolated, and averaged.

Local Digital Terrain Model (DTM) computation is performed for each changed area using the height Z or volume computations and provides the basis for using height and volume information as a validator for detected changes.

The classification regarding the presence of change is performed as follows. An initially formed feature matrix is smoothed using a Gaussian filter having a default sigma value of 10. The filtered image is thresholded, and a relaxation process refines the thresholding. The result of this process is a binary image, where the value 1 in the image indicates the presence of a change between the images in the corresponding pixel, and the value 0 indicates that there is no change. After that, morphology operations are carried out on the binary image. The aim of these operations is to reduce noise. Noise may for example be in the form of small separated objects or small holes in the larger objects.

A man-made object filter can be used to detect man-made objects within the regions that have previously been classified as changes. It may be assumed that man-made objects have straight-line boundaries and that, within a relatively small neighborhood, the boundary lines are perpendicular. Using the above assumptions, man-made object detection may be performed as follows:

Find the dominant edge direction,

Perform edge detection in the dominant and the corresponding perpendicular direction, Detect straight-line segments, Classify the line segments as belonging or not belonging to man made objects.

Figure 13:
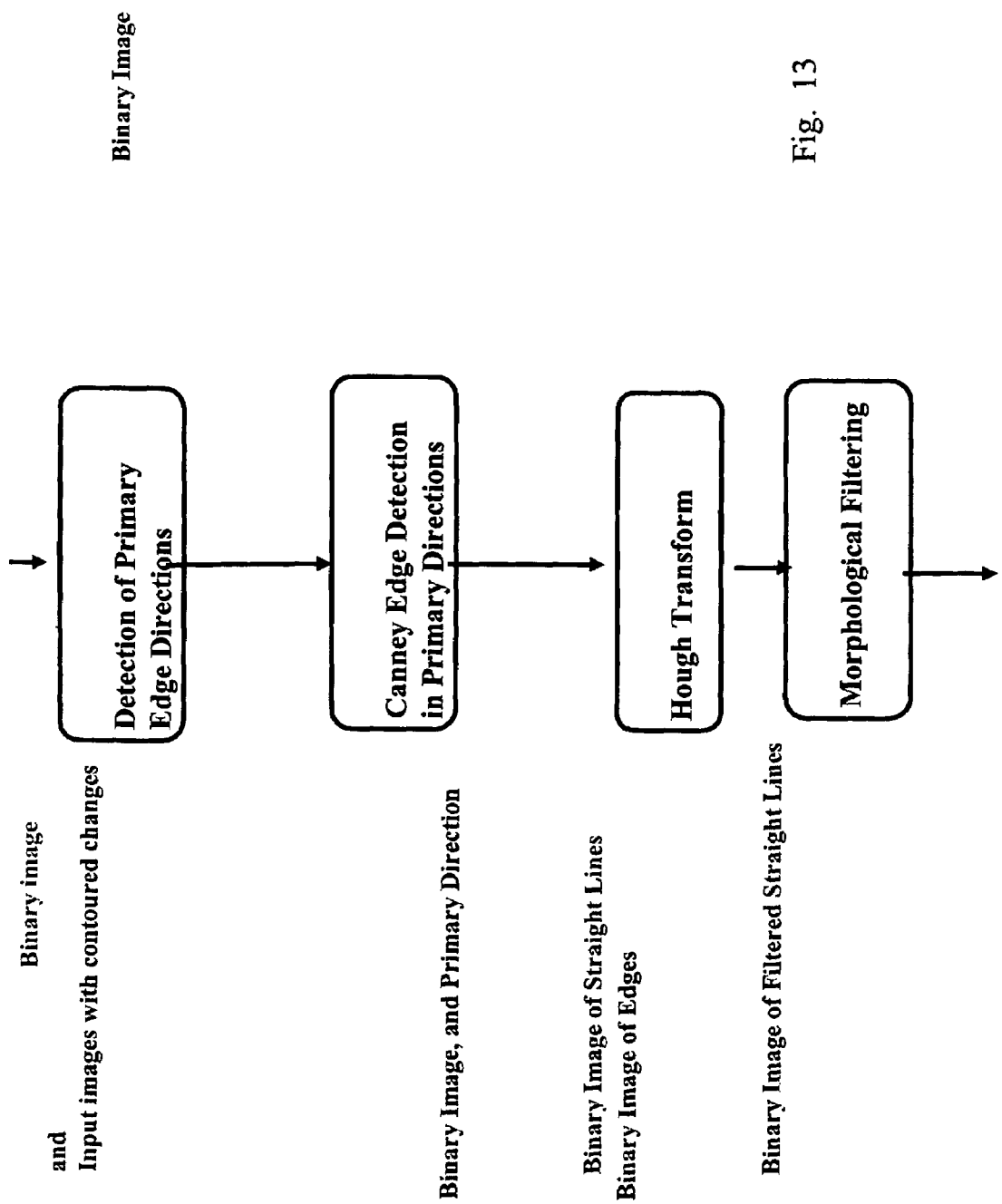
FIG. 13 is a simplified diagram illustrating detection of manmade objects according to a preferred embodiment of the present invention.

Reference is now made to FIG. 13, which is a simplified flow chart illustrating an embodiment of the above-described process. A first stage finds the dominant edge direction. Edge detection is carried out using a Canny edge detector. Information about direction of every edge element from this detector is used after quantization for computing a direction histogram of the edges. After low pass filtering of the histogram the direction that corresponds to the histogram maximum becomes clear and can be set as the dominant edge direction.

From the direction histogram, the perpendicular edge direction may also be defined as the local maximum of the histogram in the region, shifted with regard to the dominant edge direction by 90 degrees.

For edge detection in required directions the Canny edge detector is now used in a following stage to suppress every edge direction except the required ones. As a result two binary images are obtained. These are one image where edges are mainly in the dominant direction, and a second image where edges are mainly in the perpendicular direction.

For detection of straight-line segments we use the Hough Transform, which is applied to images with edges of dominant and perpendicular directions separately. We regard every edge pixel as belonging to straight line segments if the distance between a line after Hough Transform and the current pixel is less then 1 pixel. As a result of the Hough transform operation we obtain two binary images respectively containing straight line segments in the mainly dominant and the corresponding perpendicular directions.

Figure 14:
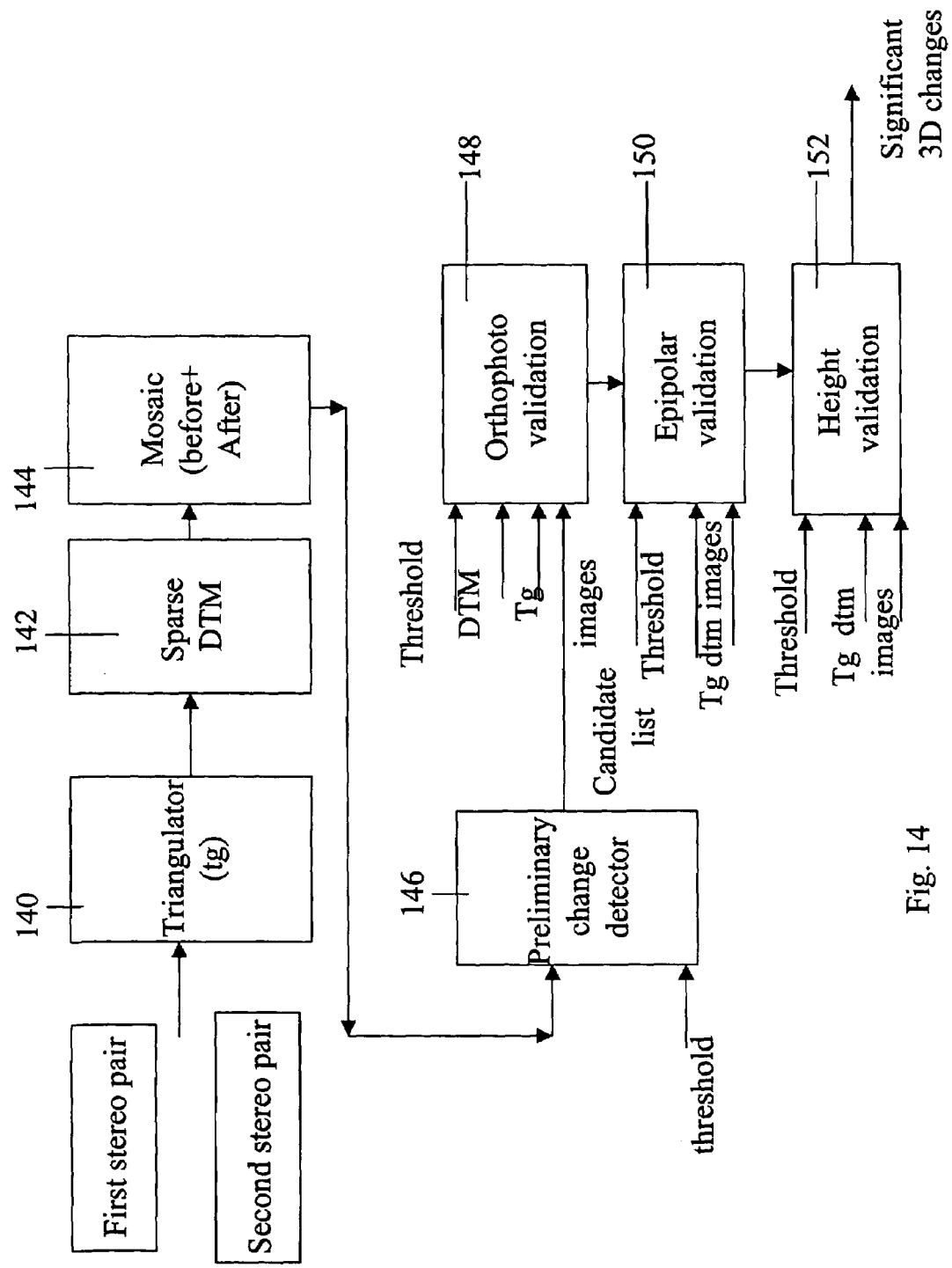
FIG. 14 is a simplified block diagram illustrating an overall change detection process according to a preferred embodiment of the present invention.

Reference is now made to FIG. 14, which is a simplified diagram illustrating the overall process according to a preferred embodiment of the present invention. In FIG. 14, two stereo images are input. A triangulation unit 140 carries out triangulation to determine height information. A sparse DTM unit 142 builds DTMs based on the reduced versions of the images. Before and after mosaics are then constructed in stage 144 and in stage 146 the two dimensional information is used to provide a preliminary change list. The preliminary list is typically large since two-dimensional information includes changes due to shadows and the like. The changes are then passed through a series of filters, 148, 150 and 152, one which eliminates changes due to movement, such as moving vehicles, one which eliminates changes due to misidentification of corresponding objects, and the final one which uses the now refined list of changes to compare with volume information. The final list of changes is restricted to those changes that correspond to changes in the volume information. The height or volume based filtering preferably includes one of the two methods for equalizing discussed hereinabove.

Figure 15:
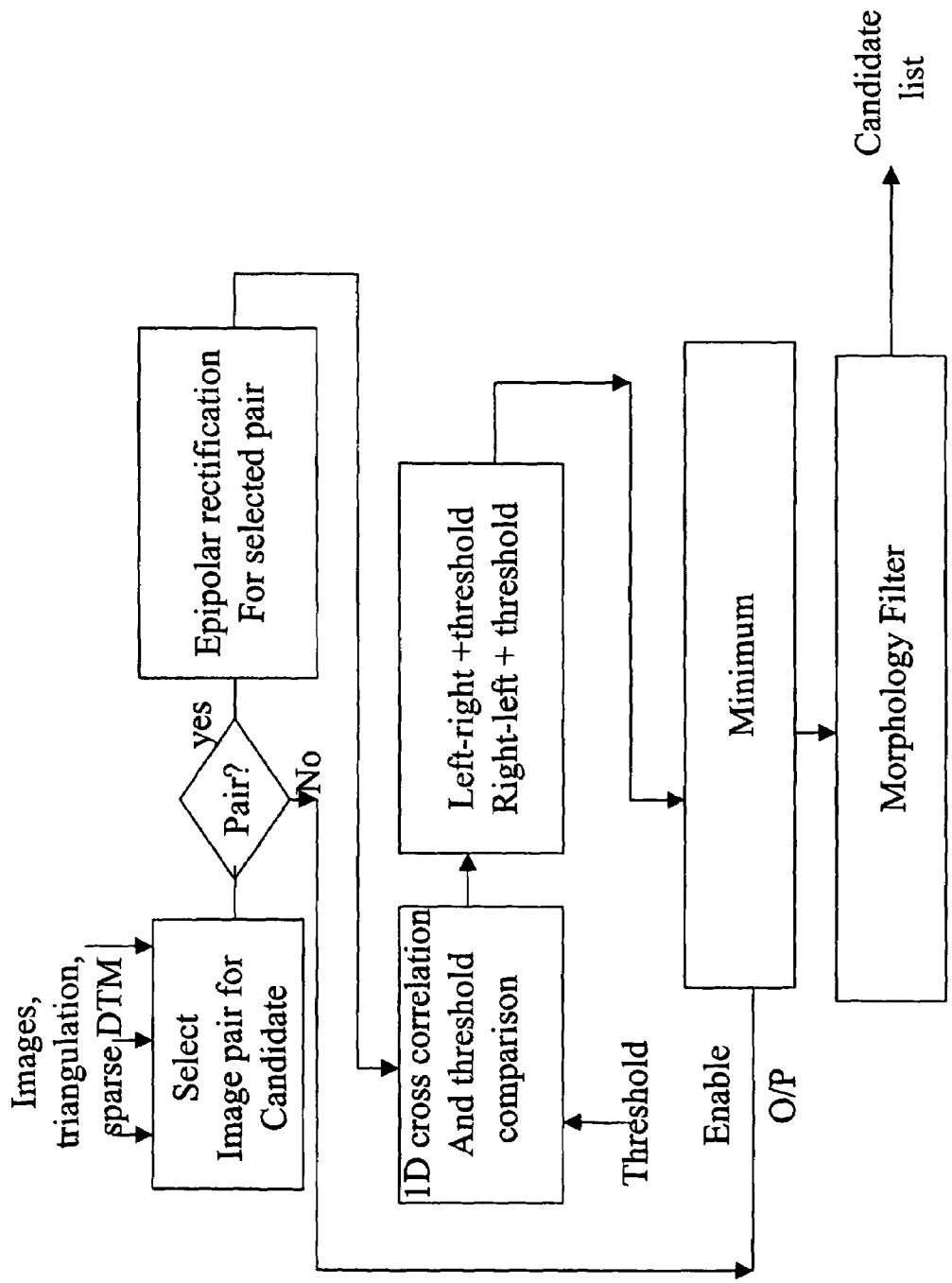
FIG. 15 is a simplified diagram showing in greater detail the epipolar rectification of FIG. 6.

Reference is now made to FIG. 15 which is a simplified flow chart illustrating the epipolar rectification process. In FIG. 15 a pair of features on the before and after images are selected. The pair of features is initially compared and then a one dimensional cross correlation is carried out from one feature to the other. Afterwards a second one-dimensional cross correlation is carried out in the opposite direction. Only if the reverse cross-correlation successfully identifies the first feature and passes a predetermined threshold, are the two features accepted as corresponding.

Figure 16:
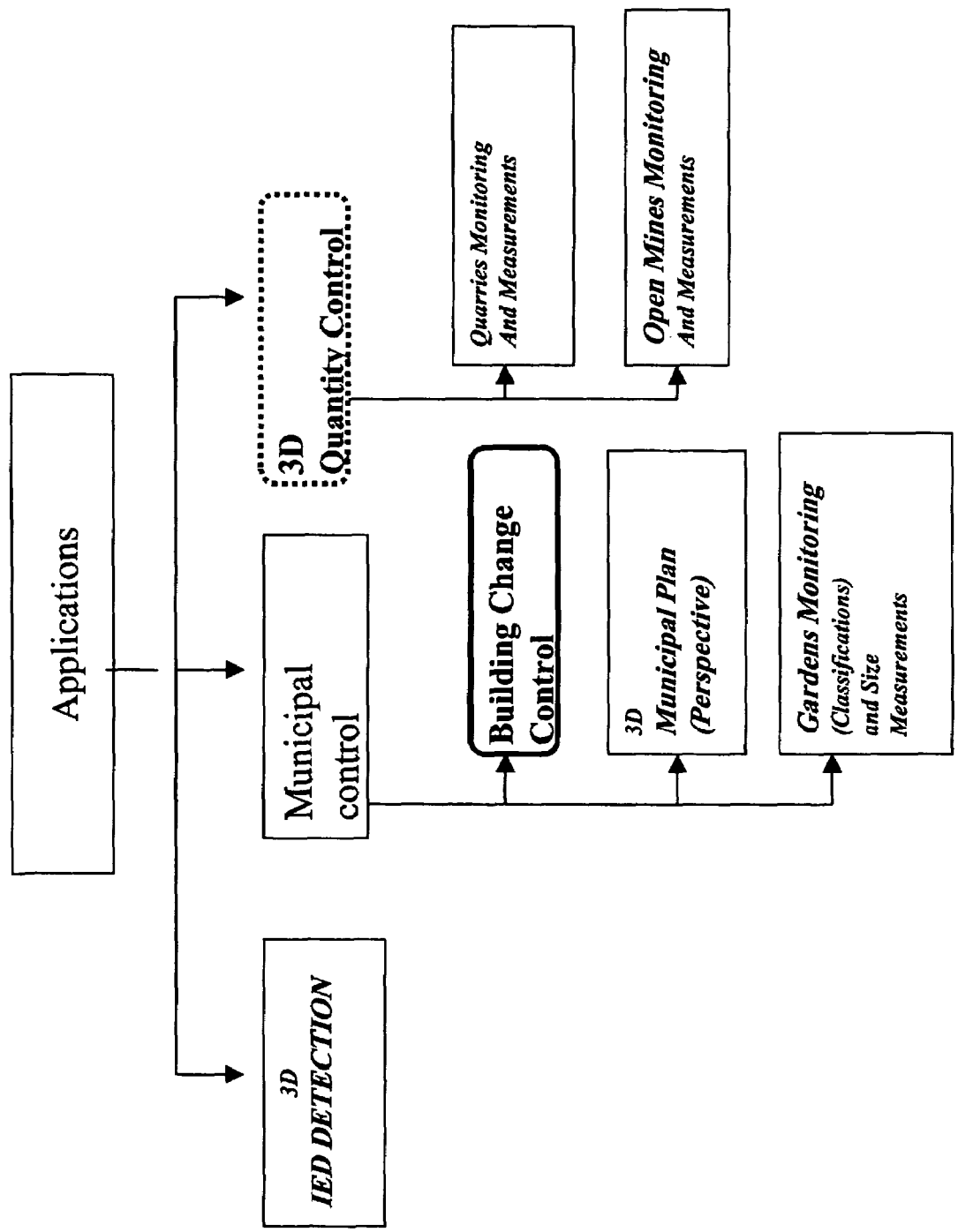
FIG. 16 is a simplified diagram illustrating an application tree of uses for the present embodiments.

Reference is now made to FIG. 16, which illustrates a range of applications for the present invention. It will be appreciated that the present list of applications is by no means exhaustive and that the teachings herein can be applied to any circumstance in which two and three dimensional information can be used in complementary fashion to enhance change detection.

Currently contemplated applications come in three categories, a military reconnaissance category, a civic enforcement category and a operational control category. Starting with the military reconnaissance category and the use of three-dimensional change to reduce the suspected changes can save the resources of intelligence analysts, allowing greater areas to be surveyed. A specific application is improvised explosive device (IED) detection. IEDs such as roadside bombs can cause a large amount of damage to passing patrols. The present embodiments allow a road to be surveyed regularly and for suspicious items of the right size to be automatically detected.

In the IED Detection application, a survey is made of the roads that the patrols may be using. It is preferred to break the road into sectors of fixed length in order to enable parallel processing of each sector using a different processor and thus to allow the image analysis to be carried out more quickly. There may for example be only a short time before the patrol reaches the location.

In the civic enforcement application, buildings and land use in general can be monitored. Changes to buildings can be detected so that the municipal authorities may check the changes against planning permission. Land use changes can be indicated by color changes. For example the application can indicate that a field has been changed into a car park, or that a certain area of land is no longer being irrigated.

The application can also produce municipal plans indicating the latest changes. The photographs can be used to monitor changes in land use for the purpose of correcting land use dependent subsidy payments for example.

In the operational control category, organizations whose activities have an effect on the landscape, such as opencast miners and quarry operators, can use the applications to monitor and control their own activities.

It is expected that during the life of this patent many relevant imaging devices and systems will be developed and the scope of the terms herein, particularly of the terms "camera" and "imaging system", is intended to include all such new technologies a priori.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method of automatic change detection between earlier and later images of a scene, wherein two-dimensional and three dimensional data is available within image data in said respective images, the method comprising:
   obtaining an initial list of candidate changes between said earlier and later images from said image data,
   identifying which of said candidate changes are associated with three dimensional data, and
   eliminating from said initial list those candidate changes which do not correspond to three-dimensional data, thereby to provide a list of three-dimensional changes.

2. A three-dimensional change detector unit for detecting changes between a first stereoscopic image pair and a second stereoscopic image pair, the apparatus comprising:
   a preliminary processor for processing said first and second images to produce a candidate list of changes;
   a digital terrain model creator for creating, from each of said stereoscopic image pairs, a first and a second digital terrain model respectively of at least positions indicated in said candidate list of changes from three-dimensional information in each stereoscopic pair,
   an equalizer for equalizing average height levels between said first and second digital terrain models, and
   a high pass filter for detecting high frequency differences between said first and second digital terrain models to affirm changes in said candidate list having high frequency components and to eliminate changes not having high frequency components, thereby to produce a refined list of changes.

3. The detector unit of claim 2, further comprising a low pass filter connected between said digital terrain model creator and said equalizer for elimination of low frequency differences between said first and said second digital terrain models.

4. A three-dimensional change detection method for detecting changes between a first stereoscopic image pair and a second stereoscopic image pair, the method comprising:
   processing said first and second images to produce a candidate list of changes;
   creating, from each of said stereoscopic image pairs, a first and a second digital terrain model respectively of at least positions indicated in said candidate list of changes from three-dimensional information in each stereoscopic pair,
   equalizing average height levels between said first and second digital terrain models,
   detecting high frequency differences between said first and second digital terrain models to affirm changes in said candidate list having high frequency components, and
   eliminating changes not having high frequency components, thereby to produce a refined list of changes.

* * * * *